United States Patent
Zhu et al.

(10) Patent No.: US 10,158,406 B2
(45) Date of Patent: Dec. 18, 2018

(54) CODEBOOK FOR FULL-DIMENSION MULTIPLE INPUT MULTIPLE OUTPUT COMMUNICATIONS

(71) Applicant: Intel IP Corporation, Santa Clara, CA (US)

(72) Inventors: Yuan Zhu, Beijing (CN); Qinghua Li, San Ramon, CA (US); Xiaogang Chen, Beijing (CN); Jong-kae Fwu, Sunnyvale, CA (US)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 15/216,378

(22) Filed: Jul. 21, 2016

(65) Prior Publication Data

US 2016/0329934 A1  Nov. 10, 2016

Related U.S. Application Data

(63) Continuation of application No. 14/668,655, filed on Mar. 25, 2015, now Pat. No. 9,425,875.

(Continued)

(51) Int. Cl.
*H04B 7/04* (2017.01)
*H04B 7/06* (2006.01)
(Continued)

(52) U.S. Cl.
CPC .......... *H04B 7/046* (2013.01); *H04B 7/0417* (2013.01); *H04B 7/0452* (2013.01);
(Continued)

(58) Field of Classification Search
CPC .... H04B 7/0417; H04B 7/0456; H04B 7/046; H04B 7/0486; H04B 7/0482;
(Continued)

(56) References Cited

U.S. PATENT DOCUMENTS

| 2014/0029684 A1 | 1/2014 | Shirani-Mehr et al. |
| 2014/0177744 A1* | 6/2014 | Krishnamurthy .... H04B 7/0469 375/267 |

(Continued)

FOREIGN PATENT DOCUMENTS

| EP | 2566085 A1 | 3/2013 |
| EP | 2894802 A1 | 7/2015 |

(Continued)

OTHER PUBLICATIONS

International Search Report and Written Opinion for International Appl. No. PCT/US2015/041600 dated Oct. 16, 2015; 15 pages.

(Continued)

*Primary Examiner* — Betsy Deppe
(74) *Attorney, Agent, or Firm* — Schwabe, Williamson & Wyatt, P.C.

(57) ABSTRACT

Various embodiments include an apparatus to be employed by an enhanced Node B (eNB), the apparatus comprising communication circuitry to receive, from a user equipment (UE), feedback information and control circuitry, coupled with the communication circuitry, to identify a codeword from a three-dimensional codebook based on the feedback information received from the UE, wherein the communication circuitry is further to precode data to be transmitted to the UE based on the codeword. An apparatus to be employed by a UE and additional methods are described.

24 Claims, 7 Drawing Sheets

Related U.S. Application Data

(60) Provisional application No. 62/055,569, filed on Sep. 25, 2014.

(51) Int. Cl.
  H04L 5/00 (2006.01)
  H04B 7/0456 (2017.01)
  H04B 7/0417 (2017.01)
  H04B 7/0452 (2017.01)
  H04W 84/04 (2009.01)

(52) U.S. Cl.
  CPC ......... *H04B 7/0469* (2013.01); *H04B 7/0478* (2013.01); *H04B 7/0486* (2013.01); *H04B 7/063* (2013.01); *H04B 7/0639* (2013.01); *H04L 5/0014* (2013.01); *H04L 5/0026* (2013.01); *H04B 7/065* (2013.01); *H04B 7/0647* (2013.01); *H04W 84/042* (2013.01)

(58) Field of Classification Search
  CPC .. H04B 7/0469; H04B 7/0478; H04B 7/0452; H04B 7/063; H04B 7/0639; H04B 7/0647; H04B 7/065; H04L 5/0014; H04L 5/0026; H04W 84/042
  See application file for complete search history.

(56) References Cited

U.S. PATENT DOCUMENTS

| | | |
|---|---|---|
| 2014/0241190 A1 | 8/2014 | Park et al. |
| 2015/0146650 A1 | 5/2015 | Ko et al. |

FOREIGN PATENT DOCUMENTS

| | | |
|---|---|---|
| EP | 2911330 A1 | 8/2015 |
| JP | 2013042340 A | 2/2013 |
| WO | 2011/100481 A1 | 8/2011 |
| WO | 2014033515 A1 | 3/2014 |
| WO | 2014059831 A1 | 4/2014 |
| WO | 2014/133280 A1 | 9/2014 |

OTHER PUBLICATIONS

3GPP, "Study on 3D channel model for LTE (Release 12)," 3GPP TR 36.873 V2.1.0 (Aug. 2014), Sep. 22, 2014, Lte Advanced, 43 pages.

3GPP TS 36.213 V12.2.0 (Jun. 2014); "Technical Specification Group Radio Access Network; Evolved Universal Terrestrial Radio Access (E-UTRA); Physical layer procedures (Release 12)," 207 pages.

Office Action dated Nov. 10, 2017 from Russian Patent Application No. 2017105769, 9 pages.

Office Action dated Mar. 27, 2018 from Japanese Patent Application No. 2017-516146, 12 pages.

\* cited by examiner

CODEBOOK FOR FULL-DIMENSION MULTIPLE INPUT MULTIPLE OUTPUT COMMUNICATIONS

CROSS-REFERENCE TO RELATED APPLICATIONS

This application is a continuation of U.S. application Ser. No. 14/668,655, filed Mar. 25, 2015, and entitled "CODEBOOK FOR FULL-DIMENSION MULTIPLE INPUT MULTIPLE OUTPUT COMMUNICATIONS," which claims priority to U.S. Provisional Application No. 62/055,569, filed Sep. 25, 2014 and entitled "3D CODEBOOK FOR FULL-DIMENSION MULTIPLE INPUT MULTIPLE OUTPUT (FD-MIMO) COMMUNICATIONS", both of which are hereby incorporated by reference in their entireties.

FIELD

Embodiments of the present disclosure generally relate to the field of wireless communication, and more particularly, to a codebook for full-dimension multiple input multiple output (FD-MIMO) communications.

BACKGROUND

Dual-codebook was introduced in Release 10 of the 3$^{rd}$ Generation Partnership Project (3GPP) Long Term Evolution (LTE) standard for beamforming of a MIMO antenna array. However, the dual-codebook can be used for the beamforming for at most 8 transmission antennas. The beamforming for a MIMO antenna array of more antennas is desired.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable hardware components that provide the described functionality.

Figure 1:
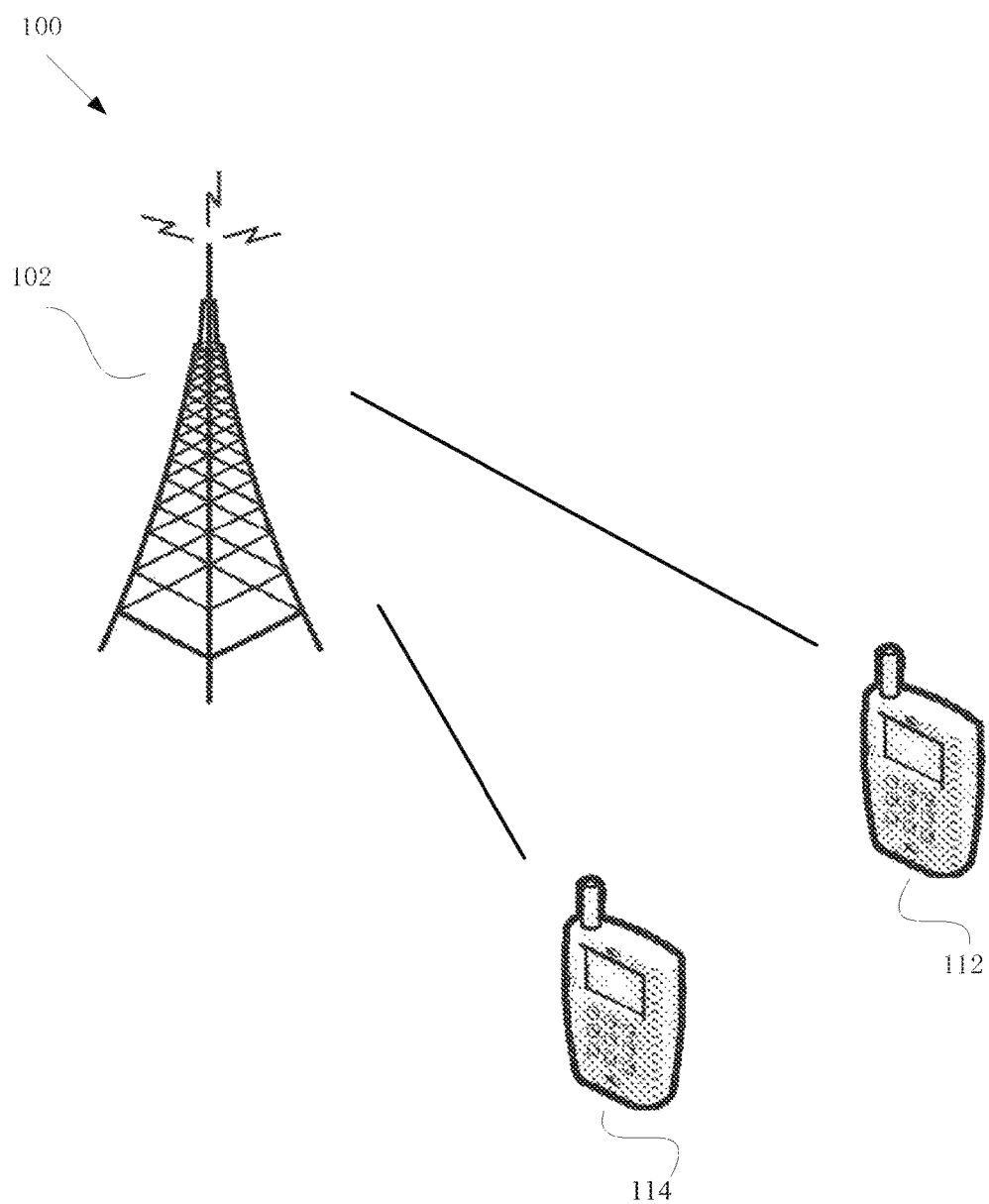
FIG. 1 schematically illustrates a wireless communication network in accordance with various embodiments.

FIG. 1 schematically illustrates a wireless communication network 100 in accordance with various embodiments. Wireless communication network 100 (hereinafter "network 100") may be a 3rd Generation Partnership Project (3GPP) long-term evolution (LTE) network (or an LTE-Advanced (LTE-A) network), including an enhanced node base station (eNB) 102 configured to wirelessly communicate with user equipments (UEs), such as UE 112 and UE 114. The eNB 102 includes an antenna array having a plurality of antennas, which may transmit signals to the UEs according to a specified codeword in a codebook. For example, the eNB 102 may transmit a reference signal from each antenna element of the antenna array to the UE 112, UE 112 then measures the reference signal to obtain the channel state information (CSI) regarding each channel associated with each antenna element of the antenna array. The CSI may indicate a codeword that may achieve a desired transmission throughput. Then, the eNB 102 may use the codeword for transmitting signals to the UE 112. The codebook includes a plurality of codewords, each of which may be a precoding matrix.

Figure 2:
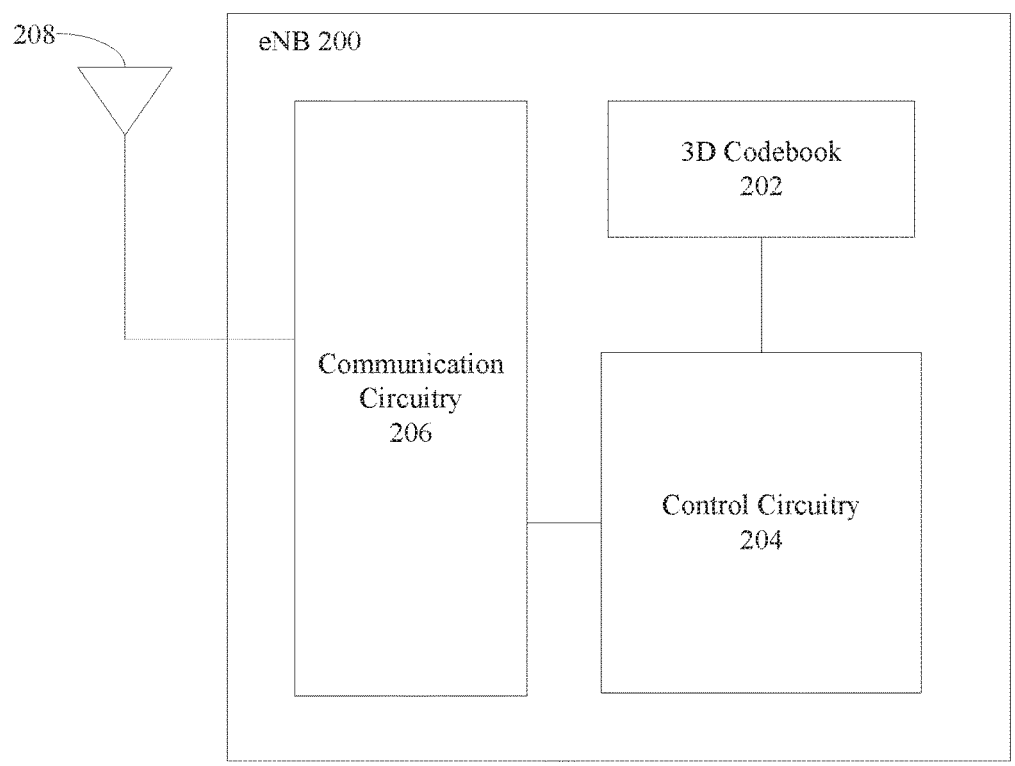
FIG. 2 schematically illustrates an eNB in accordance with some embodiments.

FIG. 2 schematically illustrates an eNB 200 in accordance with some embodiments. The eNB 200 may be similar to, and substantially interchangeable with, the eNB 102 of FIG. 1. The eNB 200 may include a 3D codebook 202, control circuitry 204, communication circuitry 206 and an antenna array 208. The 3D codebook 202 stores a plurality of codewords for the beamforming of the antenna array 208. The control circuitry 204 may be coupled with the 3D codebook 202 and the communication circuitry 206. For communication with a UE, the eNB 200 may transmit a channel state information reference signal (RS), previously known to the UE, by the communication circuitry 206 with the antenna array 208 with no precoding. Then, CSI regarding each channel associated with each antenna element of the antenna array 208 may be received from UE. The received CSI may indicate a precoding matrix that may achieve a desired throughput for transmissions from the eNB to the UE. The control circuitry 204 may identify the precoding matrix from the codebook 202 based on the CSI received from the UE, and control the communication circuitry 206 to precode the data to be transmitted with the antenna array 208 to the UE by using the identified precoding matrix. The codebook including a plurality of codewords, for example, precoding matrixes, may be maintained in both the eNB and the UE.

Due to the 3D codebook introduced in the present application, the beamforming of an antenna array having more than 8 antennas may be achieved. In various embodiments, the number of antennas in the antenna array may be a multiple of 8, such as 16, 32 and 64.

Figure 3:
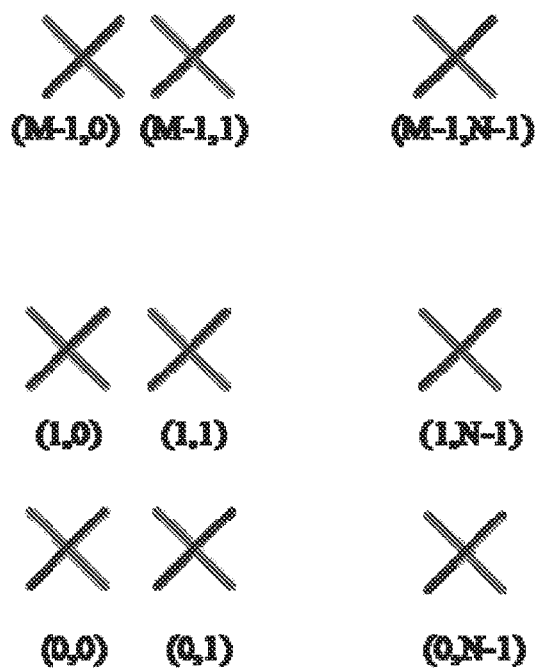
FIG. 3 schematically illustrates an antenna structure in accordance with some embodiments.
Figure 4:
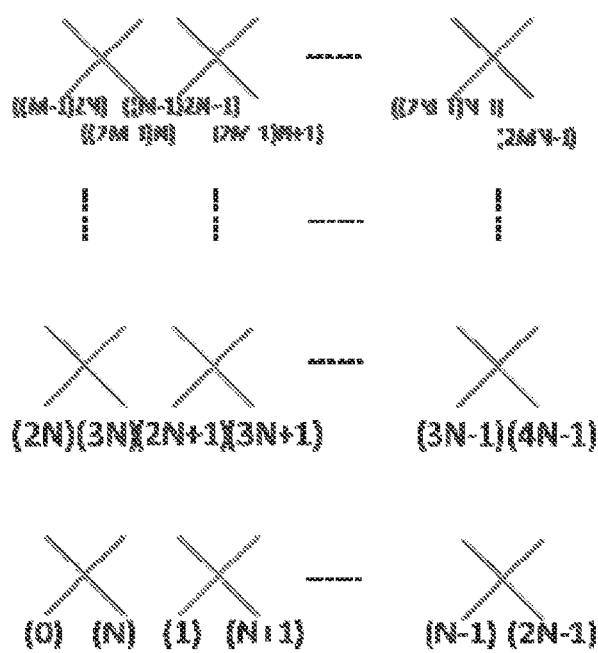
FIG. 4 schematically illustrates the antenna structure of FIG. 3 in which antenna elements are re-indexed.

FIG. 3 schematically illustrates an antenna structure that may be used in the present application in accordance with some embodiments, and FIG. 4 schematically illustrates the antenna structure of FIG. 3 in which antenna elements are re-indexed.

As shown in FIGS. 3 and 4, the illustrated antenna array has M rows and N columns. Totally 2MN antenna elements are contained in the antenna array. One possible configuration of M and N is M=8 and N=4. In this configuration the 2D planar antenna array contains 64 antenna elements. Half of the antenna elements have slant angle 45 degree and the other half of antenna elements have slant angle −45 degree. Each column is a cross-polarized array.

One FD-MIMO system can be described by:

$$y = HPx + n$$

where y is $N_r \times 1$ vector, H is $N_r \times N_t$ matrix, P is $N_t \times N_p$ matrix, x is $N_p \times 1$ vector, n is $N_r \times 1$ vector, $N_r$ is number of receiving antennas, $N_t$ is number of transmitting antennas, $N_p$ is number of layers. If the antenna array is 2D antenna array as shown in FIG. 3, $N_t = 2NM$ and $N_t$ is usually much larger than 8. For example when N=4 and M=8, $N_t = 64$.

In FIG. 4, the 2D antenna array are re-indexed. The antenna elements having −45 degree polarization angle are indexed firstly and then the antenna elements having +45 degree polarization angle are indexed. Then, all antenna elements are indexed row by row.

For an FD-MIMO system, a precoding matrix P is a matrix having Nt rows and Np columns, wherein Nt is the number of transmitting antennas in the antenna array and Np is the number of layers.

In some embodiments, the codebook includes a plurality of codewords, each of which is constructed as a product of three matrices, for example, a first matrix, a second matrix, and a third matrix. Each of the three matrices may have an index. The product of the second matrix and the third matrix may be the codeword proposed in Release 10 of 3GPP LTE. According to the present application, the codebook dimension may be of 8*N rows and 1 to 8 columns. That is, the precoding matrix may be used for the beamforming of an antenna array having 8*N antennas.

Thus, the first matrix may be an 8*N by 8 matrix. In the first matrix, there may be at most N non-zero elements in each column. The non-zero elements in all columns of the first matrix may be in different rows. In an embodiment, each of the non-zero elements may be constructed as a DFT vector. In another embodiment, each of the non-zero elements may be constructed as a non-DFT vector.

In some embodiments, the precoding matrix may depend on a first index of the first matrix, a second index of the second matrix, and a third index of the third matrix. The first index, the second index, and the third index may all be fed back from the UE as the CSI. In various embodiments, the CSI fed back from the UE may further comprise a rank indicator (RI) and/or a channel quality indicator (CQI).

Figure 5:
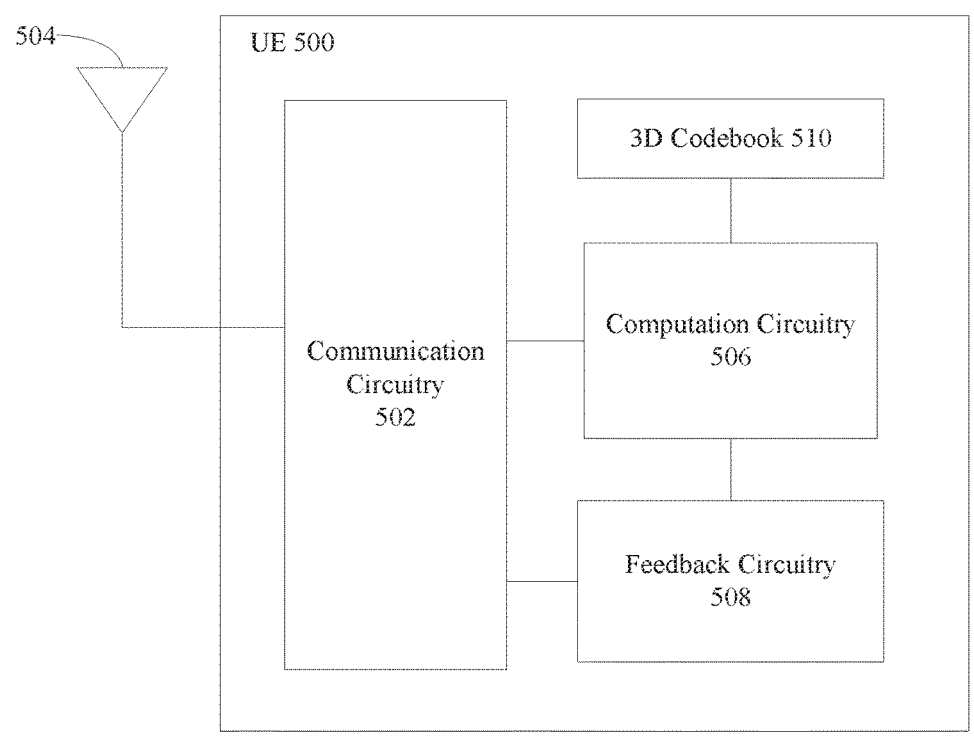
FIG. 5 schematically illustrates a UE in accordance with some embodiments.

FIG. 5 schematically illustrates a UE 500 in accordance with some embodiments. The UE 500 may be similar to, and substantially interchangeable with, the UE 112 of FIG. 1. The UE 500 may include communication circuitry 502, an antenna 504, computation circuitry 506, feedback circuitry 508, and a 3D codebook 510. The communication circuitry 502, the computation circuitry 506 and the feedback circuitry 508 may be coupled with each other.

The communication circuitry 502 receives the channel state information reference signal (RS) from the eNB with the antenna 504. The computation circuitry 506 determines channel states associated with each transmission antenna of the eNB. Based on the determined channel states associated with each transmission antenna of the eNB, the computation circuitry 506 selects a precoding matrix from the 3D codebook 510 for transmission data from the eNB. The feedback circuitry 508 sends information indicating the selected precoding matrix to the eNB via the communication circuitry 502 and the antenna 504.

As described above, each precoding matrix in the codebook may be constructed as a product of three matrixes, for example, a first matrix, a second matrix, and a third matrix, with each of the matrices having a respective index.

In some embodiments, the computation circuitry 506 may select a precoding matrix from the 3D codebook 510 so that a desired throughput will likely be obtained when the selected precoding matrix is used by the eNB to transmit data to the UE. Various specific measurement criteria may be used for considering the throughput.

In some embodiments, the codebook dimension is of 2N*M rows and 1 to 2N columns. The precoding matrix may be used for the beamforming of an antenna array having 2N*M antennas. Thus, the first matrix may be a 2N*M by 2N matrix. In the first matrix, there may be at most N non-zero elements in each column. The non-zero elements in all columns of the first matrix may be in different rows. In an embodiment, each of the non-zero elements may be constructed as a DFT vector. In another embodiment, each of the non-zero elements may be constructed as a non-DFT vector.

In some embodiments, the precoding matrix may depend on a first index of the first matrix, a second index of the second matrix, and a third index of the third matrix. The first index, the second index, and the third index may all be fed back from the UE as the CSI. In various embodiments, the CSI fed back from the UE may further comprise a RI and/or a CQI.

In some embodiments, the first index of the first matrix may not be frequently changed. Thus, in a periodical CSI report, the index of the first matrix may be fed back in a period equal to or being multiple of the period in which the RI is fed back.

In some embodiments, the first index of the first matrix may not be frequency-sensitive. Thus, in an aperiodic CSI report, the index of the first matrix may be fed back as a wideband parameter.

In some embodiments, the precoding matrix P may be constructed by:

$$P(i0, i1, i2) = W_0(i0) W_1(i1) W_2(i2)$$

wherein $W_0(i0)$, $W_1(i1)$ and $W_2(i2)$ are the above mentioned three matrixes with indexes i0, i1 and i2, respectively. Matrixes $W_1(i1)$ and $W_2(i2)$ are the same as those proposed in the Release 10 of the 3GPP LTE for 2N=8 and in the Release 12 of 3GPP LTE for 2N=4.

If the full channel matrix can be measured by defining a CSI-RS resource with {16, 32, 64} antenna ports, the 3D codebook may be defined with up to rank 8 for {16, 32, 64} antenna ports by extending the existing Rel-10 8Tx codebook or Rel-12 4Tx codebook.

In some embodiments, the matrix $W_1(i1)$ may be a block diagonal matrix:

$$W_1(i1) = \begin{bmatrix} X(i1) & 0 \\ 0 & X(i1) \end{bmatrix}, \text{ where } i1 = 0, 1, 2, \ldots, 15; \text{ and}$$

$$X(i1) = \begin{bmatrix} 1 & 1 & 1 & 1 \\ q_1^{2i1} & q_1^{2i1+1} & q_1^{2i1+2} & q_1^{2i1+3} \\ q_1^{4i1} & q_1^{2(2i1+1)} & q_1^{2(2i1+2)} & q_1^{2(2i1+3)} \\ q_1^{6i1} & q_1^{4(2i1+1)} & q_1^{4(2i1+2)} & q_1^{4(2i1+3)} \end{bmatrix} \text{ where } q_1 = e^{j2\pi/32}.$$

For rank one precoder, the matrix $W_2(i2)$ may be:

$$W_2(i2) \in \left\{ \frac{1}{2}\begin{bmatrix} Y \\ Y \end{bmatrix}, \frac{1}{2}\begin{bmatrix} Y \\ jY \end{bmatrix}, \frac{1}{2}\begin{bmatrix} Y \\ -Y \end{bmatrix}, \frac{1}{2}\begin{bmatrix} Y \\ -jY \end{bmatrix} \right\},$$

where $Y = e_i \in \{e_1, e_2, e_3, e_4\}$.

For rank two precoder, the matrix $W_2(i2)$ may be:

$$W_2(i2) \in \left\{ \frac{1}{2\sqrt{2}}\begin{bmatrix} Y_1 & Y_2 \\ Y_1 & -Y_2 \end{bmatrix}, \frac{1}{2\sqrt{2}}\begin{bmatrix} Y_1 & Y_2 \\ jY_1 & -jY_2 \end{bmatrix} \right\},$$

where $(Y_1, Y_2) = (e_i, e_k) \in$ $\{(e_1, e_1), (e_2, e_2), (e_3, e_3), (e_4, e_4), (e_1, e_2), (e_2, e_3), (e_1, e_4), (e_2, e_4)\}.$ In some embodiments, the first matrix $W_0(i0)$ may be constructed by expanding discrete Fourier transform (DFT) vector:

$$W_0(i0) = [w_0(i0)_{m,n}], 0 \le m \le N_t - 1, 0 \le n \le 7$$

$$\text{where } w_0(i0)_{m,n} = \begin{cases} \frac{1}{\sqrt{M}} e^{-i\frac{2\pi}{\lambda} d_v \lfloor \frac{m}{8} \rfloor \cos(\theta(i0))}, & m \%8 == n, \\ 0 \end{cases}$$

$\lambda$ is wavelength, $d_v$ is the spacing between two vertical antenna elements, and $\theta(i0) \in \{\theta_{start} + \theta_{step} i0, 0 \le i0 < 2^L\}$. $\theta_{start}$, $\theta_{step}$, and L represent a start zenith angle, a zenith angle step size and a codebook size, respectively, each of which may be configured in radio resource control (RRC) configurations. In one example, $\theta_{start}=78$, $\theta_{step}=6$ and L=3. In another example, $\theta_{start}=78$, $\theta_{step}=3$ and L=4.

In some embodiments, the first matrix $W_0(i0)$ may be constructed by combining $2^{L-1}$ codewords using DFT vectors and $2^{L-1}$ codewords using non-DFT vectors as follows:

$$w_0(i0)_{m,n} = \begin{cases} \frac{1}{\sqrt{M}} e^{-i\frac{2\pi}{\lambda} d_v \lfloor \frac{m}{8} \rfloor \cos(\theta(i0))}, & m \%8 == n, 0 \le i0 < 8 \\ \frac{1}{\sqrt{M}} e^{-i(\vartheta(i0, \lfloor \frac{m}{8} \rfloor))}, & m \%8 == n, 8 \le i0 < 16 \\ 0 \end{cases}$$

where $$\vartheta\left(i0, \left\lfloor \frac{m}{8} \right\rfloor\right)$$

may be designed as such that more than one major channel direction in the zenith dimension is covered. Thus the vertical antenna pattern for $$\frac{1}{\sqrt{M}} e^{-i(\vartheta(i0, \lfloor \frac{m}{8} \rfloor))}$$

may have more than one gain peak, which may be different from the DFT vector which may have one main peak.

In some embodiments, it is also possible to construct the first matrix $W_0(i0)$ by all codewords using non-DFT vectors.

No matter how the first matrix $W_0(i0)$ is constructed, the first matrix may be 2N*M by 2N matrix that has at most M non-zero elements in each column, and the non-zero elements in all columns may be in different rows.

For the constructed matrixes $W_0(i0)$, $W_1(i1)$ and $W_2(i2)$, a first index i0, a second index i1, and a third index i2 may be selected by the UE considering the channel state estimated from the RS signal received from the eNB. The first index i0, the second index i1, and the third index i2 may be selected so that a desired, for example, large throughput will be achieved if the eNB transmit data to the UE by the antenna array using the corresponding precoding matrix.

Figure 6:
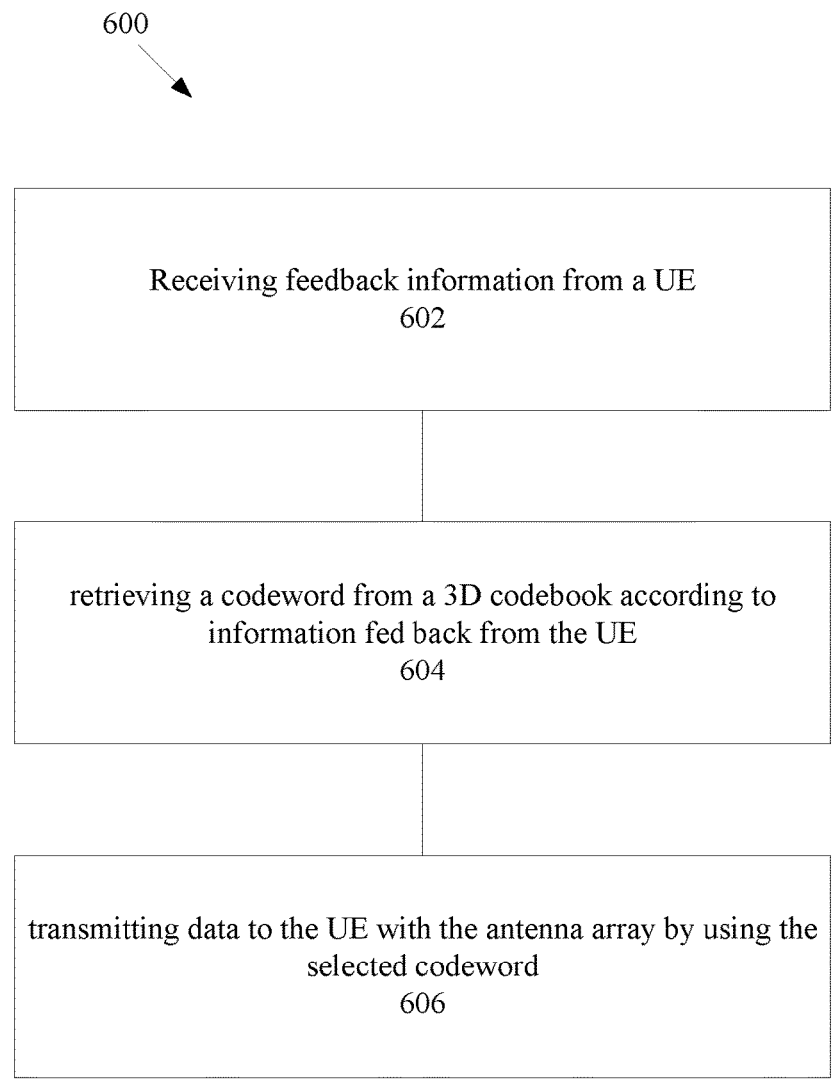
FIG. 6 is a flowchart describing a method to be performed by an eNB in accordance with some embodiments.

FIG. 6 illustrates a method 600 in accordance with some embodiments. The method 600 may be performed by an eNB such as eNB 102 or 200. In some embodiments, the eNB may include and/or have access to one or more computer-readable media having instructions stored thereon, that, when executed, cause the eNB to perform the method 600. The eNB may additionally/alternatively have circuitry configured to perform some or all of the operations described with respect to the method 600.

The method 600 may include, at 602, receiving feedback information from a UE. The received feedback information may be determined by the UE from channel state reference signal previously received from the eNB for measuring the channel state associated with each antenna element in the antenna array.

The method 600 may include, at 604, identifying a codeword from a three-dimensional codebook based on the feedback information received from the UE. In some embodiments, the codebook may be maintained in both the eNB and the UE and may include a plurality of codewords, each of which is constructed as a product of a first matrix, a second matrix, and a third matrix. In some embodiments, the information fed back from the UE may comprise a first index of the first matrix, a second index of the second matrix, a third index of the third matrix, and a rank indicator (RI). In some embodiments, a codebook size, a start zenith angle, and a zenith angle step size of the codebook may be configurable by RRC signaling.

The method 600 may include, at 606, precoding data to be transmitted to the UE based on the codeword. In some embodiments, the first matrix may be an 8*N by 8 matrix that has at most N non-zero elements in each column, and the non-zero elements in all columns may be in different rows. The second matrix and the third matrix may be the matrixes proposed in the Release 10 of the 3GPP LTE. In various embodiments, each of the non-zero elements in the first matrix may be constructed as a DFT vector, a non-DFT vector, or a combination thereof. In some embodiments, the codebook dimension may be of 8*N rows and 1 to 8 columns, wherein 8*N is equal to the number of antennas in the antenna array.

Figure 7:
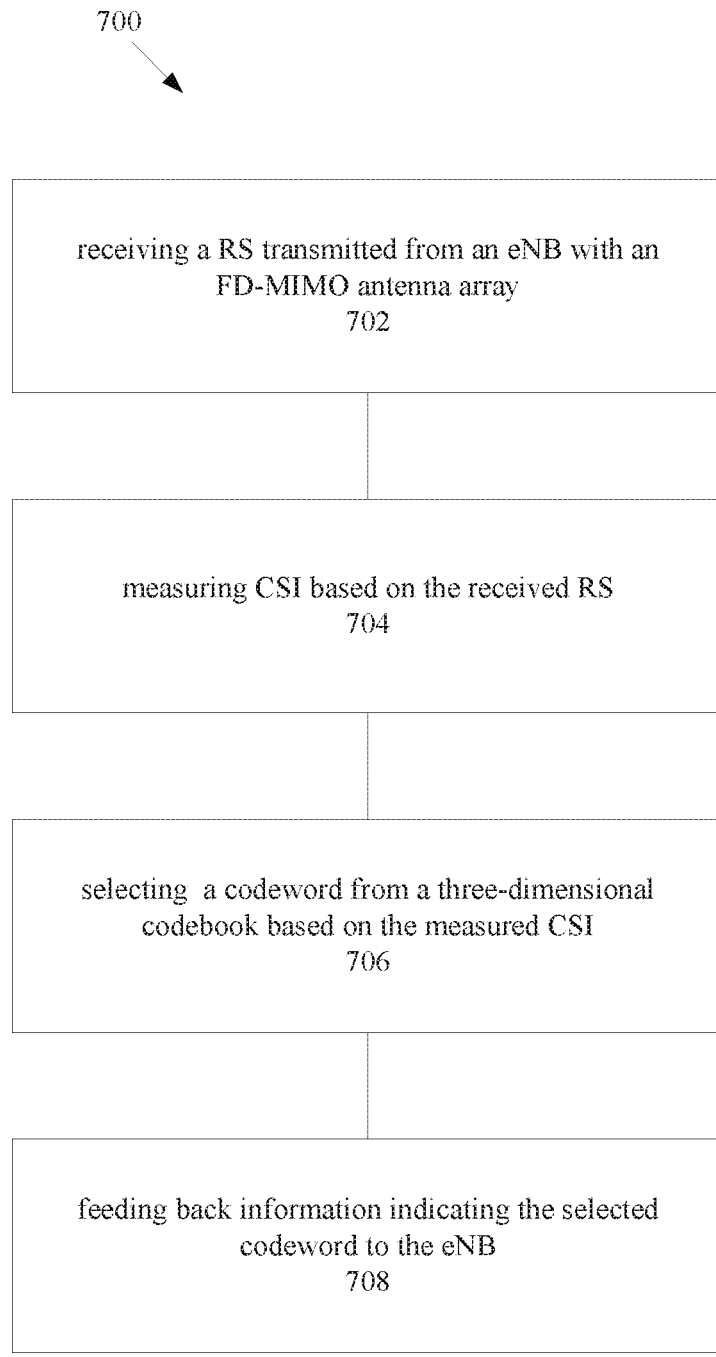
FIG. 7 is a flowchart describing a method to be performed by a UE in accordance with some embodiments.

FIG. 7 illustrates a method 700 in accordance with some embodiments. The method 700 may be performed by a UE such as UE 112 or 500. In some embodiments, the UE may include and/or have access to one or more computer-readable media having instructions stored thereon, that, when executed, cause the UE to perform the method 700. The UE may additionally/alternatively have circuitry configured to perform some or all of the operations described with respect to the method 700.

The method 700 may include, at 702, receiving a channel state information reference signal transmitted from an eNB with a two-dimensional antenna array. The method 700 may include, at 704, measuring channel state information of the antenna array based on the received channel state information reference signal. The method 700 may include, at 706, selecting a codeword from a three-dimensional codebook based on the measured channel state information. The method 700 may include, at 708, feeding information indicating the selected codeword back to the eNB.

In some embodiments, the codebook may be maintained in both the eNB and the UE and may include a plurality of codewords, each of which may be constructed as a product of a first matrix, a second matrix, and a third matrix. In some embodiments, the information fed back from the UE may comprise a first index of the first matrix, a second index of the second matrix, a third index of the third matrix, and a rank indicator (RI). In some embodiments, a codebook size, a start zenith angle and a zenith angle step size of the codebook may be configurable by RRC signaling.

In some embodiments, the first matrix may be a 2N*M by 2N matrix that may have at most M non-zero elements in each column, and the non-zero elements in all columns may be in different rows. The second matrix and the third matrix are the matrixes proposed in the Release 10 of the 3GPP LTE for 8Tx and proposed in the Release 12 of the 3GPP LTE for 4Tx. In various embodiments, each of the non-zero elements in the first matrix may be constructed as a DFT vector, a non-DFT vector, or a combination thereof. In some embodiments, the codebook dimension is of 2N*M rows and 1 to 2N columns, wherein 2N*M is equal to the number of antennas in the antenna array.

In some embodiments, the first index of the first matrix may not be frequently changed. Thus, in a periodical CSI report, the index of the first matrix may be fed back in a period equal to or being multiple of that of the RI.

In some embodiments, the first index of the first matrix may not be frequency-sensitive. Thus, in an aperiodic CSI report, the index of the first matrix may be fed back as a wideband parameter.

Figure 8:
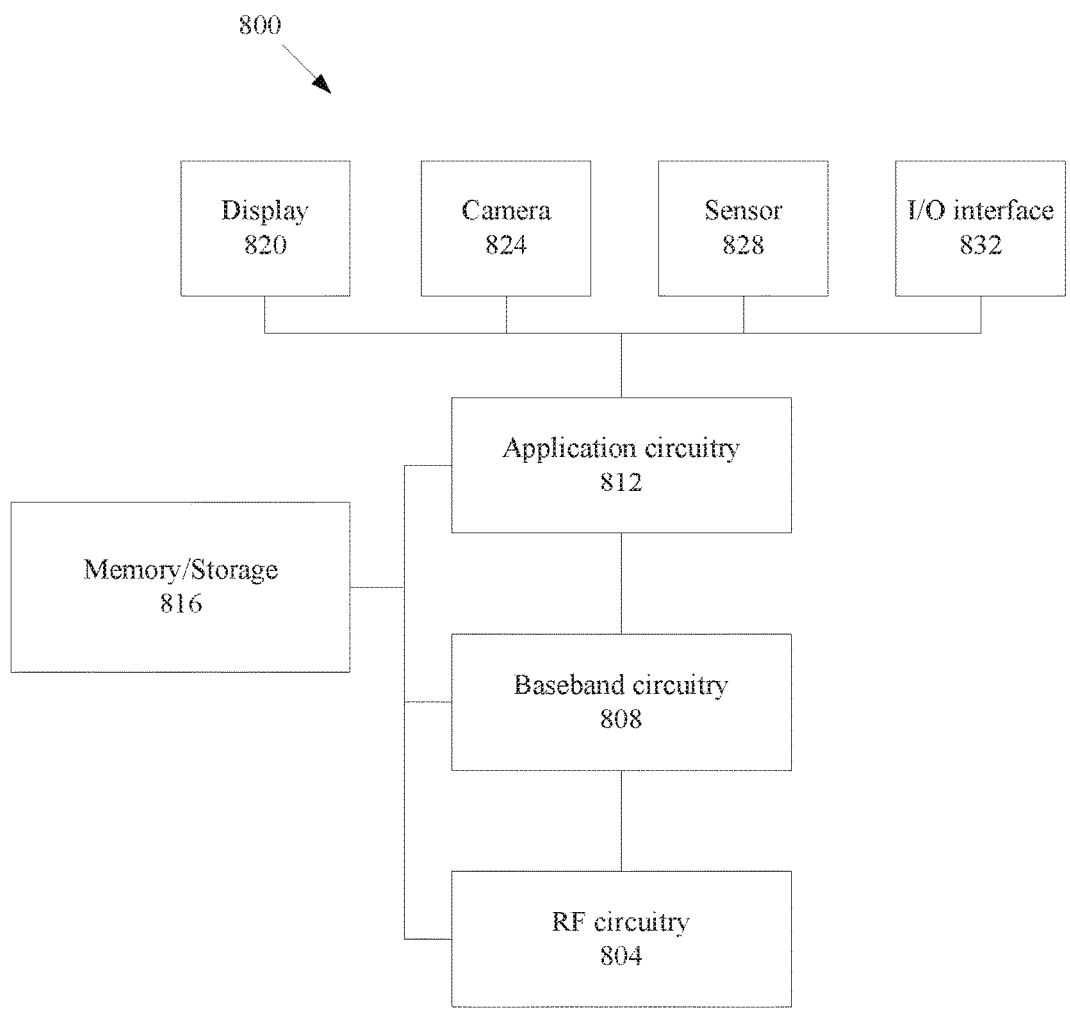
FIG. 8 is a block diagram of an example computing device that may be used to practice various embodiments described herein.

An eNB and a UE described herein may be implemented into a system using any suitable hardware and/or software to configure as desired. FIG. 8 illustrates, for one embodiment, an example system 800 which comprises radio frequency (RF) circuitry 804, baseband circuitry 808, application circuitry 812, a memory 816, a display 820, a camera 824, a sensor 828, and an input/output (I/O) interface 832, coupled with each other at least as shown. The application circuitry 812 may include a circuitry such as, but not limited to, one or more single-core or multi-core processors. The processor(s) may include any combination of general-purpose processors and dedicated processors (e.g., graphics processors, application processors, etc.). The processors may be coupled with the memory 816 and configured to execute instructions stored in the memory 816 to enable various applications and/or operating systems running on the system 800.

The baseband circuitry 808 may include a circuitry such as, but not limited to, one or more single-core or multi-core processors. The processor(s) may include a baseband processor. The baseband circuitry 808 may handle various radio control functions that enable communication with one or more radio networks via the RF circuitry. The radio control functions may include, but are not limited to, signal modulation, encoding, decoding, radio frequency shifting, etc. In some embodiments, the baseband circuitry 808 may provide for communication compatible with one or more radio technologies. For example, in some embodiments, the baseband circuitry 808 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 808 is configured to support radio communications of more than one wireless protocol may be referred to as multi-mode baseband circuitry.

In various embodiments, the baseband circuitry 808 may include circuitry to operate with signals that are not strictly considered as being in a baseband frequency. For example, in some embodiments, the baseband circuitry 808 may include a circuitry to operate with signals having an intermediate frequency, which is between a baseband frequency and a radio frequency.

The RF circuitry 804 may enable communication with wireless network using modulated electromagnetic radiation through a non-solid medium. In various embodiments, the RF circuitry 804 may include switches, filters, amplifiers, etc. to facilitate the communication with the wireless network.

In various embodiments, the RF circuitry 804 may include a circuitry to operate with signals that are not strictly considered as being in a radio frequency. For example, in some embodiments, the RF circuitry 804 may include a circuitry to operate with signals having an intermediate frequency, which is between a baseband frequency and a radio frequency. In some embodiments, some or all of the constituent components of the baseband circuitry 808, the application circuitry 812, and/or the memory 816 may be implemented together on a system on a chip (SOC).

In an embodiment in which the system 800 represents an access node, for example, an access node 300, the communication circuitry of the access node may be implemented in the RF circuitry 804 and/or the baseband circuitry 808 and the configuration and the control circuitry may be implemented in the baseband circuitry 808 and/or the application circuitry 812.

In an embodiment in which the system 800 represents a UE, for example, UE 200, the components of the UE, for example, communication circuitry, channel determination circuitry, and interference estimation circuitry, may be implemented in the RF circuitry 804 and/or the baseband circuitry 808.

The memory/storage 816 may be used to load and store data and/or instructions, for example, for the system 800. The memory/storage 816 for one embodiment may include any combination of suitable volatile memory (e.g., a dynamic random access memory (DRAM)) and/or non-volatile memory (e.g., a flash memory).

In various embodiments, the I/O interface 832 may include one or more user interfaces designed to enable user interaction with the system 800 and/or peripheral component interfaces designed to enable peripheral component interaction with the system 800. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 828 may include one or more sensing devices to determine environmental conditions and/or location information related to the system 800. In some embodiments, the sensors may include, but are not limited to, a gyro sensor, an accelerometer, a proximity sensor, an ambient light sensor, and a positioning unit. The positioning unit may also be part of, or interact with, the baseband circuitry 808 and/or the RF circuitry 804 to communicate with components of a positioning network, e.g., a global positioning system (GPS) satellite.

In various embodiments, the display 820 may include a display (e.g., a liquid crystal display, a touch screen display, etc.).

In various embodiments, the system 800 may be a mobile computing device such as, but not limited to, a laptop computing device, a tablet computing device, a netbook, an ultrabook, a smartphone, etc. In various embodiments, the system 800 may have more or less components, and/or different architectures.

The following paragraphs describe examples of various embodiments.

Example 1 includes an apparatus to be employed by an enhanced Node B (eNB), the apparatus comprising: communication circuitry to receive, from a user equipment (UE), feedback information; and control circuitry, coupled with the communication module, to identify a codeword from a three-dimensional codebook based on the feedback information received from the UE, wherein the communication circuitry is further to precode data to be transmitted to the UE based on the codeword.

Example 2 includes an apparatus of example 1, wherein the communication circuitry is to transmit a channel state information signal to the UE using a two-dimensional antenna array.

Example 3 includes an apparatus of example 1 or 2, wherein the three-dimensional codebook includes a plurality of codewords, each of which is constructed as a product of a first matrix, a second matrix, and a third matrix.

Example 4 includes an apparatus of example 3, wherein the first matrix is a 2N*M by 2N matrix that has at most M non-zero elements in each column, and the non-zero elements in all columns are in different rows.

Example 5 includes an apparatus of example 4, wherein each of the non-zero elements is constructed as a discrete Fourier transform (DFT) vector or non-DFT vector.

Example 6 includes an apparatus of any of examples 3-5, wherein the feedback information received from the UE comprises a first index of the first matrix, a second index of the second matrix, a third index of the third matrix, and a rank indicator (RI).

Example 7 includes an apparatus of example 6, wherein the first index of the first matrix is to be fed back, in a periodical CSI report, in a period equal to or a multiple of a period in which the RI is fed back.

Example 8 includes an apparatus of example 6, wherein the first index of the first matrix is fed back as a wideband parameter.

Example 9 includes an apparatus of any of examples 1-8, wherein the three-dimensional codebook comprises 2N*M rows and 1 to 2N columns, where 2N*M is equal to the number of antennas in an antenna array.

Example 10 includes an apparatus of any of examples 1-9, wherein the control circuitry is to configure a codebook size, a start zenith angle, and a zenith angle step size of the three-dimensional codebook by radio resource control (RRC) signaling.

Example 11 includes an apparatus to be employed by a user equipment (UE), the apparatus comprising: communication circuitry to receive a channel state information reference signal transmitted from an enhanced Node B (eNB); computation circuitry, coupled with the communication circuitry, to measure channel state information based on the channel state information reference signal, and select a codeword from a three-dimensional codebook based on the measured channel state information; and feedback circuitry, coupled to the computation circuitry, to feed back information to indicate the selected codeword to the eNB.

Example 12 includes an apparatus of example 11, wherein the three-dimensional codebook includes a plurality of codewords, each of which is constructed as a product of a first matrix, a second matrix and a third matrix.

Example 13 includes an apparatus of example 12, wherein the first matrix is a 2N*M by 2N matrix that has at most M non-zero elements in each column, and the non-zero elements in all columns are in different rows.

Example 14 includes an apparatus of example 13, wherein each of the non-zero elements is constructed as a discrete Fourier transform (DFT) vector or non-DFT vector.

Example 15 includes an apparatus of any of examples 12-14, wherein the information fed back to the eNB comprises a first index of the first matrix, a second index of the second matrix, a third index of the third matrix and a rank indicator (RI).

Example 16 includes an apparatus of example 15, wherein the first index of the first matrix is to be fed back, in a periodical CSI report, in a period equal to or a multiple of a period in which the RI is fed back.

Example 17 includes an apparatus of example 15, wherein the first index of the first matrix is fed back as a wideband parameter.

Example 18 includes an apparatus of any of examples 11-17, wherein the three-dimensional codebook comprises 2N*M rows and 1 to 2N columns, 2N*M is equal to the number of antennas in the antenna array.

Example 19 includes one or more non-transitory computer-readable media having instructions that, when executed, cause an enhanced Node B (eNB) to: receive feedback information from a user equipment (UE); identify a codeword from a three-dimensional codebook based on the received feedback information; precode data to be transmitted to the UE based on the identified codeword; and transmit the precoded data to the UE.

Example 20 includes one or more non-transitory computer-readable media of example 19, wherein the three-dimensional codebook includes a plurality of codewords, each of which is constructed as a product of a first matrix, a second matrix and a third matrix.

Example 21 includes one or more non-transitory computer-readable media of example 20, wherein the first matrix is a 2N*M by 2N matrix that has at most M non-zero elements in each column, and the non-zero elements in all columns are in different rows.

Example 22 includes one or more non-transitory computer-readable media of example 21, wherein each of the non-zero elements is constructed as a DFT vector or non-DFT vector.

Example 23 includes one or more non-transitory computer-readable media of any of examples 20-22, wherein the feedback information received from the UE comprises a first index of the first matrix, a second index of the second matrix, a third index of the third matrix, and a rank indicator (RI).

Example 24 includes one or more non-transitory computer-readable media of example 23, wherein the first index of the first matrix is to be fed back, in a periodical CSI report, in a period equal to or a multiple of a period in which the RI is fed back.

Example 25 includes one or more non-transitory computer-readable media of example 23, wherein the first index of the first matrix is fed back as a wideband parameter.

Example 26 includes one or more non-transitory computer-readable media having instructions that, when executed, cause a user equipment (UE) to receive channel state information reference signal transmitted from an enhanced Node B (eNB) with a two-dimensional antenna array; measure channel state information of the antenna array based on the received channel state information reference signal; select a codeword from a three-dimensional codebook based on the measured channel state information; and feed information indicating the selected codeword back to the eNB.

Example 27 includes one or more non-transitory computer-readable media of example 26, wherein the codebook includes a plurality of codewords, each of which is constructed as a product of a first matrix, a second matrix and a third matrix.

Example 28 includes one or more non-transitory computer-readable media of example 27, wherein the first matrix is a 2N*M by 2N matrix which has at most 2M non-zero elements in each column, and the non-zero elements in all columns are in different rows.

Example 29 includes one or more non-transitory computer-readable media of example 28, wherein each of the non-zero elements is constructed as a DFT vector or non-DFT vector.

Example 30 includes one or more non-transitory computer-readable media of any of examples 27-29, wherein the feedback information received from the UE comprises a first index of the first matrix, a second index of the second matrix, a third index of the third matrix, and a rank indicator (RI).

Example 31 includes one or more non-transitory computer-readable media of example 30, wherein the first index of the first matrix is to be fed back, in a periodical CSI report, in a period equal to or a multiple of a period in which the RI is fed back.

Example 32 includes one or more non-transitory computer-readable media of example 30, wherein the first index of the first matrix is fed back as a wideband parameter.

Example 33 includes one or more non-transitory computer-readable media of any of examples 26-32, wherein the three-dimensional codebook comprises 2N*M rows and 1 to 2N columns, 2N*M is equal to the number of antennas in the antenna array.

Example 34 includes a method comprising: receiving, by an enhanced Node B (eNB), feedback information from a user equipment (UE); identifying, by the eNB, a codeword from a three-dimensional codebook based on the feedback information received from the UE; and precoding, by the eNB, data to be transmitted to the UE based on the codeword.

Example 35 includes a method of example 34, wherein the three-dimensional codebook includes a plurality of codewords, each of which is constructed as a product of a first matrix, a second matrix and a third matrix.

Example 36 includes a method of example 35, wherein the first matrix is a 2N*M by 2N matrix which has at most M non-zero elements in each column, and the non-zero elements in all columns are in different rows.

Example 37 includes a method of example 36, wherein each of the non-zero elements is constructed as a DFT vector or non-DFT vector.

Example 38 includes a method of any of examples 35-37, wherein the feedback information received from the UE comprises a first index of the first matrix, a second index of the second matrix, a third index of the third matrix, and a rank indicator (RI).

Example 39 includes a method of any of examples 34-38, wherein the three-dimensional codebook comprises 2N*M rows and 1 to 2N columns, and 2N*M is equal to the number of antennas in the antenna array.

Example 40 includes a method of any of examples 34-39, which further comprises configuring, by the eNB, a codebook size, a start zenith angle and a zenith angle step size of the codebook by RRC signaling.

Example 41 includes a method comprising: receiving, by a user equipment (UE), a channel state information reference signal transmitted from an enhanced Node B (eNB) with a two-dimensional antenna array; measuring, by the UE, channel state information of the antenna array based on the received channel state information reference signal; selecting, by the UE, a codeword from a three-dimensional codebook based on the measured channel state information; and feeding, by the UE, information indicating the selected codeword back to the eNB.

Example 42 includes a method of example 41, wherein the codebook includes a plurality of codewords, each of which is constructed as a product of a first matrix, a second matrix and a third matrix.

Example 43 includes a method of example 42, wherein the first matrix is a 2N*M by 2N matrix which has at most M non-zero elements in each column, and the non-zero elements in all columns are in different rows.

Example 44 includes a method of example 43, wherein each of the non-zero elements is constructed as a DFT vector or non-DFT vector.

Example 45 includes a method of example 41, wherein the feedback information received from the UE comprises a first index of the first matrix, a second index of the second matrix, a third index of the third matrix, and a rank indicator (RI).

Example 46 includes a method of example 45, wherein the first index of the first matrix is to be fed back, in a periodical CSI report, in a period equal to or a multiple of a period in which the RI is fed back.

Example 47 includes a method of example 45, wherein the first index of the first matrix is fed back as a wideband parameter.

Example 48 includes an apparatus having means for performing the methods of any of examples 34-47.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. An apparatus to be employed by an enhanced Node B (eNB), the apparatus comprising:
communication circuitry to receive, from a user equipment (UE), feedback information; and
control circuitry, coupled with the communication circuitry, to identify a codeword from a three-dimensional codebook based on the feedback information received from the UE, wherein the communication circuitry is to precode data to be transmitted to the UE based on the codeword and the three-dimensional codebook includes a plurality of codewords, each of which is constructed as a product of a first matrix, a second matrix, and a third matrix, wherein the first matrix includes an expansion of a discrete Fourier transform (DFT) vector via a complex exponential that takes into account spacing between antenna elements.

2. The apparatus of claim 1, wherein a product of the second matrix and the third matrix corresponds to a codeword of a dual-codebook.

3. The apparatus of claim 1, wherein the communication circuitry is to transmit a channel state information signal to the UE using a two-dimensional antenna array.

4. The apparatus of claim 1, wherein the first matrix has a dimension of 2N*M by 2N and has at most M-number of non-zero elements in each column, and the non-zero elements in all columns are in different rows, where 2N*M is equal to a number of antennas in an antenna array, wherein M is a number of rows of an antenna array, and wherein N is a number of columns of the antenna array.

5. The apparatus of claim 4, wherein the non-zero elements include the expansion of the DFT vector and a non-DFT vector.

6. The apparatus of claim 1, wherein the feedback information to be received from the UE comprises a first index of the first matrix, a second index of the second matrix, a third index of the third matrix, and a rank indicator (RI).

7. The apparatus of claim 6, wherein the first index of the first matrix is to be fed back, in a periodical channel state information (CSI) report, in a period equal to or a multiple of a period in which the RI is to be fed back.

8. The apparatus of claim 6, wherein the first index of the first matrix is to be fed back as a wideband parameter.

9. The apparatus of claim 1, wherein the three-dimensional codebook comprises (2N*M)-number of rows and (1 to 2N)-number of columns, where 2N*M is equal to a number of antennas in an antenna array, wherein M is a number of rows of the antenna array, and wherein N is a number of columns of the antenna array.

10. The apparatus of claim 1, wherein the expansion of the DFT vector $W_0(i0)$ is represented as:

$$W_0(i0) = \underline{[w_0(i0)_{m,n}]}_{8}, 0 \leq m \leq N_t - 1, 0 \leq n \leq 7$$

where $w_0(i0)_{m,n} =$ $$\begin{cases} \frac{1}{\sqrt{M}} e^{-i\frac{2\pi}{\lambda}d_v \lfloor \frac{m}{8} \rfloor \cos(\theta(i0))}, & m \bmod 8 = n \text{ } \lambda \text{ is wavelength,} \\ 0 \end{cases}$$

$d_v$ is the spacing between the antenna elements in one dimension, $N_t$ is a number of transmitting antennas, M is a number of rows of an antenna array, and $\theta(i0) \in \{\theta_{start} + \theta_{step} i0, 0 \leq i0 < 2^L\}$, in which $\theta_{start}$, $\theta_{step}$, and L represent a start zenith angle, a zenith angle step size and a codebook size, respectively.

11. An apparatus to be employed by a user equipment (UE), the apparatus comprising:
communication circuitry to receive a channel state information reference signal transmitted from an enhanced Node B (eNB);
computation circuitry, coupled with the communication circuitry, to measure channel state information based on the channel state information reference signal, and select a codeword from a three-dimensional codebook based on the measured channel state information, wherein the three-dimensional codebook includes a plurality of codewords, each of which is constructed as a product of a first matrix, a second matrix and a third matrix, the first matrix includes an expansion of a discrete Fourier transform (DFT) vector via a complex exponential that takes into account spacing between antenna elements, and the codebook has a codebook dimension that includes (2N*M)-number of rows and (1 to 2N)-number of columns, where 2N*M is equal to a number of antennas in an antenna array, wherein M is a number of rows of the antenna array, and wherein N is a number of columns of the antenna array; and
feedback circuitry, coupled to the computation circuitry, to feed back information to indicate the selected codeword to the eNB.

12. The apparatus of claim 11, wherein a product of the second matrix and the third matrix corresponds to a codeword of a dual-codebook.

13. The apparatus of claim 11, wherein the first matrix has a dimension of 2N*M by 2N and has at most M-number of non-zero elements in each column, and the non-zero elements in all columns are in different rows.

14. The apparatus of claim 13, wherein the non-zero elements include the expansion of the DFT vector and a non-DFT vector.

15. The apparatus of claim 11, wherein the information to be fed back to the eNB comprises a first index of the first matrix, a second index of the second matrix, a third index of the third matrix and a rank indicator (RI).

16. The apparatus of claim 15, wherein the first index of the first matrix is to be fed back, in a periodical channel state information (CSI) report, in a period equal to or a multiple of a period in which the RI is to be fed back.

17. The apparatus of claim 15, wherein the first index of the first matrix is to be fed back as a wideband parameter.

18. The apparatus of claim 11, wherein the expansion of the DFT vector, $W_0(i0)$, is represented as:

$$W_0(i0) = \underline{[w_0(i0)_{m,n}]}_{8}, 0 \leq m \leq N_t - 1, 0 \leq n \leq 7$$

where $w_0(i0)_{m,n} =$ $$\begin{cases} \frac{1}{\sqrt{M}} e^{-i\frac{2\pi}{\lambda}d_v \lfloor \frac{m}{8} \rfloor \cos(\theta(i0))}, & m \bmod 8 = n \text{ } \lambda \text{ is wavelength,} \\ 0 \end{cases}$$

$d_v$ is the spacing between the antenna elements in one dimension, $N_t$ is a number of transmitting antennas, M is a number of rows of an antenna array, and $\theta(i0) \in \{\theta_{start} + \theta_{step} i0, 0 \leq i0 < 2^L\}$, in which $\theta_{start}$, $\theta_{step}$, and L represent a start zenith angle, a zenith angle step size and a codebook size, respectively.

19. One or more non-transitory computer-readable media having instructions that, when executed, cause an enhanced Node B (eNB) to:
   receive feedback information from a user equipment (UE);
   identify a codeword from a three-dimensional codebook based on the received feedback information;
   precode data to be transmitted to the UE based on the identified codeword; and
   transmit the precoded data to the UE, wherein the three-dimensional codebook includes a plurality of codewords, each of which is constructed as a product of a first matrix, a second matrix and a third matrix, and the first matrix includes an expansion of a discrete Fourier transform (DFT) vector via a complex exponential that takes into account spacing between antenna elements, has a dimension of 2N*M by 2N and has at most M-number of non-zero elements in each column, and the non-zero elements in all columns are in different rows, where 2N*M is equal to a number of antennas in an antenna array.

20. The one or more non-transitory computer-readable media of claim 19, wherein the non-zero elements include the expansion of the DFT vector and a non-DFT vector.

21. The one or more non-transitory computer-readable media of claim 19, wherein the feedback information to be received from the UE comprises a first index of the first matrix, a second index of the second matrix, a third index of the third matrix, and a rank indicator (RI).

22. The one or more non-transitory computer-readable media of claim 21, wherein the first index of the first matrix is to be fed back, in a periodical channel state information (CSI) report, in a period equal to or a multiple of a period in which the RI is to be fed back.

23. The one or more non-transitory computer-readable media of claim 21, wherein the first index of the first matrix is to be fed back as a wideband parameter.

24. The one or more non-transitory computer-readable media of claim 19, wherein the expansion of the DFT vector, $W_o(i0)$, may be represented as:

$$W_0(i0) = \frac{[w_0(i0)_{m,n}]}{8}, 0 \leq m \leq N_t - 1.0 \leq n \leq 7$$

where $w_0(i0)_{m,n} =$ $$\begin{cases} \frac{1}{\sqrt{M}} e^{-i\frac{2\pi}{\lambda}d_v\lfloor \frac{m}{8} \rfloor \cos(\theta(i0))}, & m \bmod 8 = n \; \lambda \text{ is wavelength,} \\ 0 \end{cases}$$

$d_v$ is the spacing between the antenna elements in one dimension, Nt is a number of transmitting antennas, M is a number of rows of the antenna array, and $\theta(i0) \in \{\theta_{start} + \theta_{step} i0, 0 \leq i0 < 2^L\}$, in which $\theta_{start}$, $\theta_{step}$, and L represent a start zenith angle, a zenith angle step size and a codebook size, respectively.

* * * * *